US012614273B2

(12) United States Patent
Fitzgerald et al.

(10) Patent No.: US 12,614,273 B2
(45) Date of Patent: Apr. 28, 2026

(54) SYSTEM AND METHODS FOR ZONE-GUIDED REPAIR SCOPE OPTIMIZATION

(71) Applicant: GE Infrastructure Technology LLC, Greenville, SC (US)

(72) Inventors: Kevin M. Fitzgerald, Atlanta, GA (US); Stanley F. Simpson, Greenville, SC (US); Arpit Jain, Fremont, CA (US); Karen Kokal Maud, Greenville, SC (US); Sabharish Murali, Bengaluru (IN)

(73) Assignee: GE Infastructure Technology LLC, Greenville, SC (US)

( * ) Notice: Subject to any disclaimer, the term of this patent is extended or adjusted under 35 U.S.C. 154(b) by 312 days.

(21) Appl. No.: 18/340,409

(22) Filed: Jun. 23, 2023

(65) Prior Publication Data

US 2024/0428397 A1     Dec. 26, 2024

(51) Int. Cl.
*G06T 7/00* (2017.01)
*G06T 5/50* (2006.01)
(Continued)

(52) U.S. Cl.
CPC .............. *G06T 7/0008* (2013.01); *G06T 5/50* (2013.01); *G06T 7/001* (2013.01); *G06T 17/00* (2013.01);
(Continued)

(58) Field of Classification Search
CPC ........... G01N 21/9501; G01N 21/8806; G01N 21/94; G01N 21/95623; G01N 21/8851;
(Continued)

(56) References Cited

U.S. PATENT DOCUMENTS

| | | | |
|---|---|---|---|
| 4,604,715 A | 8/1986 | Toutant et al. | |
| 5,539,656 A | 7/1996 | Annigeri et al. | |
| | (Continued) | | |

FOREIGN PATENT DOCUMENTS

| | | |
|---|---|---|
| EP | 0469315 B1 | 5/1996 |
| GB | 2590469 A | 6/2021 |
| WO | 2022171624 A1 | 8/2022 |

OTHER PUBLICATIONS

Nakazawa et al., Anomaly Detection and Segmentation for Wafer Defect Patterns Using Deep Convolutional Encoder-Decoder Neural Network Architectures in Semiconductor Manufacturing, IEEE Transactions on Semiconductor Manufacturing, Feb. 5 (Year: 2019).*

(Continued)

*Primary Examiner* — Alex Kok S Liew
(74) *Attorney, Agent, or Firm* — Armstrong Teasdale LLP

(57) ABSTRACT

An inspection system is disclosed. The inspection system includes an image capturing system oriented to capture at least one component image of a component from at least one viewing angle, the at least one component image including a set of features selected to enable features of the components and features of defects on surfaces of the component to be identified, and a processor. The processor is configured to classify a type of defect detected on surfaces of the component in the at least one component image and assign zones to surfaces of the component captured in the at least one component image.

29 Claims, 9 Drawing Sheets

(51) Int. Cl.
| | |
|---|---|
| *G06T 17/00* | (2006.01) |
| *G06V 10/44* | (2022.01) |
| *G06V 10/764* | (2022.01) |

(52) U.S. Cl.
CPC ............ *G06V 10/44* (2022.01); *G06V 10/764* (2022.01); *G06T 2207/20084* (2013.01); *G06T 2207/20221* (2013.01)

(58) Field of Classification Search
CPC ......... G01N 2021/8822; G01N 21/956; G01N 21/95607; G01N 2201/0697; G01N 21/9503; G01N 21/95684; G01N 27/127; G01N 33/0031; G01N 21/4788; G01N 21/9505; G01N 2201/06113; G01N 2201/12; G01N 21/47; G01N 2021/479; G01N 2021/8838; G01N 21/8803; G01N 2201/0696; G01N 33/0037; G01N 33/004; G01N 33/0042; G06T 7/0004; G06T 2207/30148; G06T 7/001; G06T 2207/20081; G06T 2207/30164; G06T 2207/10061; G06T 2207/20084; G06T 2207/30108; G06T 2207/10056; G06T 5/50; G06T 7/0008; G06T 7/13; G06T 2207/10116; G06T 2207/30121; G06T 7/0006; G06T 2207/10148; G06T 2207/20221; G06T 2207/30024; G06T 2207/30141; G06T 7/0012; G06T 7/194; G06T 7/30
See application file for complete search history.

(56) References Cited

U.S. PATENT DOCUMENTS

| | | | |
|---|---|---|---|
| 5,774,212 | A | 6/1998 | Corby, Jr. |
| 6,336,082 | B1 | 1/2002 | Nguyen et al. |
| 6,748,112 | B1 | 6/2004 | Nguyen et al. |
| 6,915,236 | B2 | 7/2005 | Tanner et al. |
| 6,959,235 | B1 | 10/2005 | Abdel-Malek et al. |
| 6,970,238 | B2 | 11/2005 | Gerhard et al. |
| 7,187,436 | B2 | 3/2007 | Harding et al. |
| 7,462,827 | B2 | 12/2008 | Asano et al. |
| 7,489,811 | B2 | 2/2009 | Brummel et al. |
| 7,549,339 | B2 | 6/2009 | Staroselsky et al. |
| 8,208,711 | B2 | 6/2012 | Venkatachalam et al. |
| 8,244,025 | B2 | 8/2012 | Davis et al. |
| 8,368,749 | B2 | 2/2013 | Lambdin et al. |
| 8,477,154 | B2 | 7/2013 | Davis et al. |
| 8,744,166 | B2 | 6/2014 | Scheid et al. |
| 8,792,705 | B2 | 7/2014 | Scheid et al. |
| 9,064,172 | B2 | 6/2015 | Jia et al. |
| 9,154,743 | B2 | 10/2015 | Hatcher, Jr. et al. |
| 9,251,582 | B2 | 2/2016 | Lim et al. |
| 9,310,312 | B2 | 4/2016 | Jahnke et al. |
| 9,458,735 | B1 | 10/2016 | Diwinsky et al. |
| 9,483,820 | B2 | 11/2016 | Lim et al. |
| 9,536,311 | B2 | 1/2017 | Song et al. |
| 9,618,424 | B2 | 4/2017 | Deascanis et al. |
| 9,785,919 | B2 | 10/2017 | Diwinsky et al. |
| 9,818,039 | B2 | 11/2017 | Bendall |
| 10,054,552 | B1 | 8/2018 | Frutuoso et al. |
| 10,473,593 | B1 | 11/2019 | Xiong et al. |
| 10,504,218 | B2 | 12/2019 | Finn et al. |
| 10,775,314 | B2 | 9/2020 | Tan et al. |
| 10,878,556 | B2 | 12/2020 | Hestand et al. |
| 10,943,320 | B2 | 3/2021 | Finn et al. |
| 11,068,752 | B2 | 7/2021 | Bian et al. |
| 11,169,129 | B2 | 11/2021 | Blais et al. |
| 11,410,298 | B2 | 8/2022 | Finn et al. |
| 2002/0128790 | A1 | 9/2002 | Woodmansee |
| 2010/0002142 | A1 | 1/2010 | Finn et al. |
| 2013/0222574 | A1* | 8/2013 | Nakagaki ............. G06T 7/0004 348/125 |
| 2015/0138342 | A1 | 5/2015 | Brdar et al. |
| 2015/0204799 | A1* | 7/2015 | Cipriany ........... G01N 21/9501 702/185 |
| 2017/0147990 | A1 | 5/2017 | Franke et al. |
| 2021/0034504 | A1 | 2/2021 | Blais et al. |
| 2021/0192670 | A1 | 6/2021 | Finn et al. |
| 2022/0171982 | A1 | 6/2022 | Gosinski et al. |
| 2022/0277497 | A1 | 9/2022 | Patwari et al. |
| 2022/0382262 | A1 | 12/2022 | Arthur et al. |

OTHER PUBLICATIONS

European Search Report received for EP24179011 on Nov. 19, 2024; 9 pps.

* cited by examiner

100

110

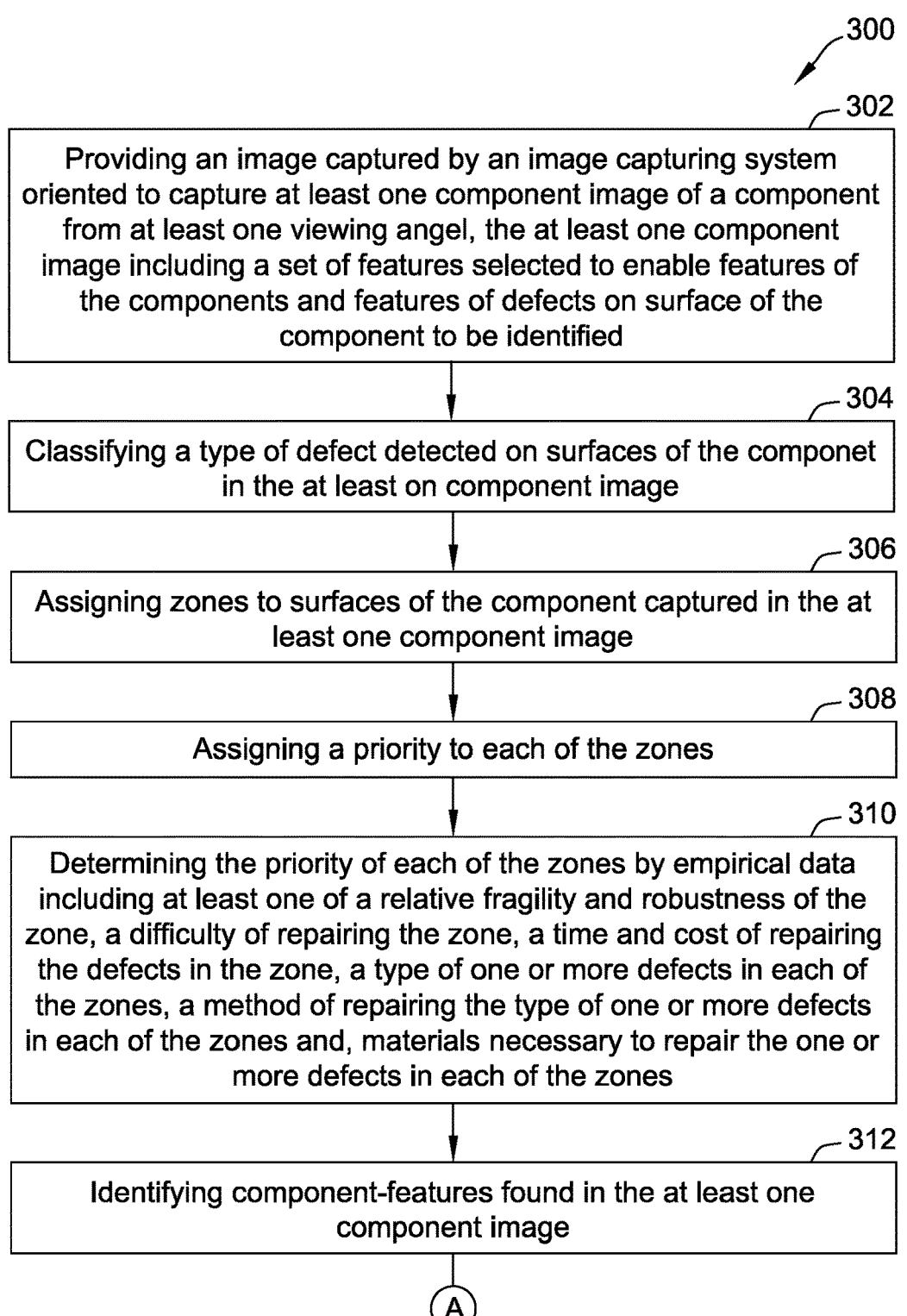

300

302

Providing an image captured by an image capturing system oriented to capture at least one component image of a component from at least one viewing angel, the at least one component image including a set of features selected to enable features of the components and features of defects on surface of the component to be identified

304

Classifying a type of defect detected on surfaces of the componet in the at least on component image

306

Assigning zones to surfaces of the component captured in the at least one component image

308

Assigning a priority to each of the zones

310

Determining the priority of each of the zones by empirical data including at least one of a relative fragility and robustness of the zone, a difficulty of repairing the zone, a time and cost of repairing the defects in the zone, a type of one or more defects in each of the zones, a method of repairing the type of one or more defects in each of the zones and, materials necessary to repair the one or more defects in each of the zones

312

Identifying component-features found in the at least one component image (A)

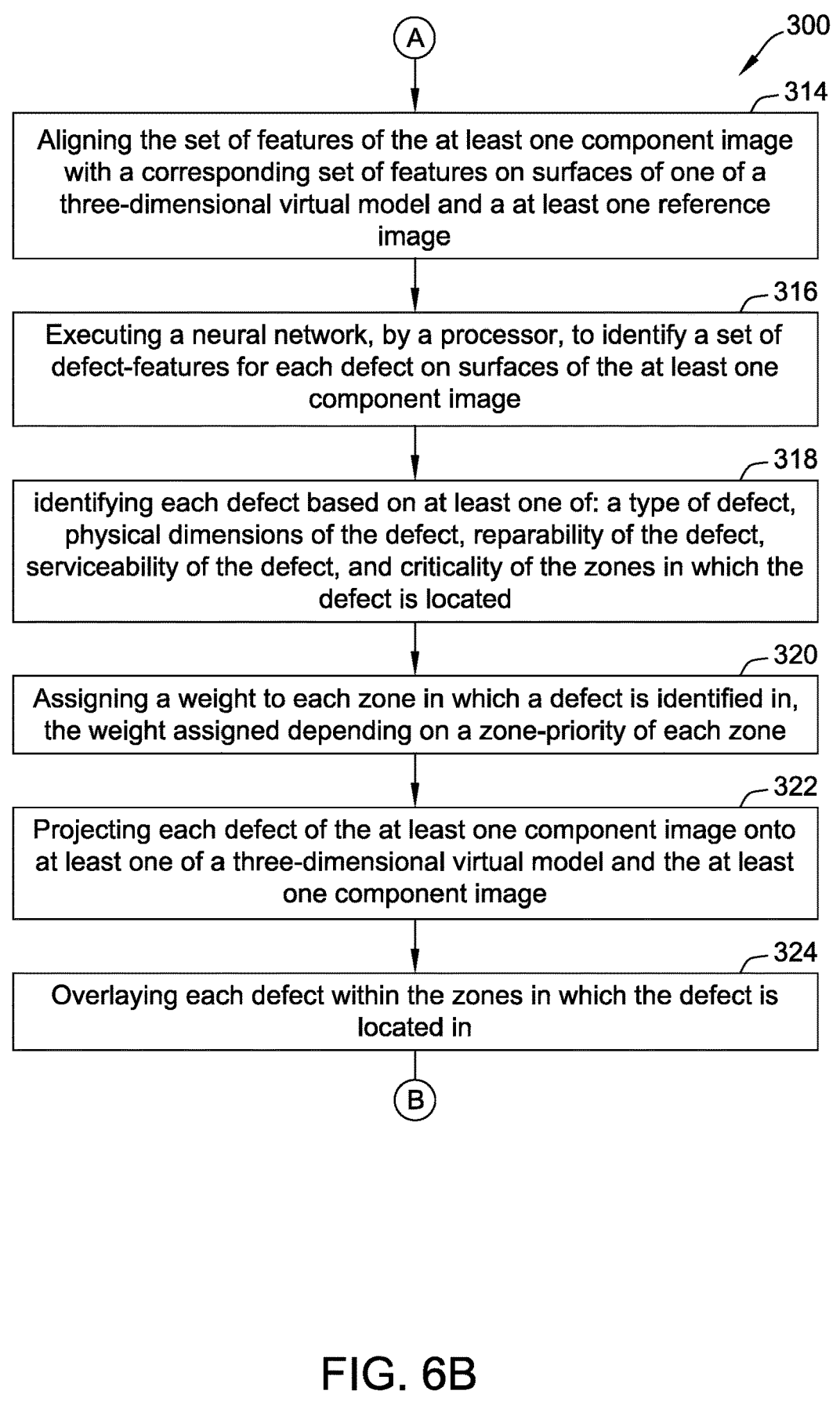

FIG. 6A (A)                                                    300
                                                        314

Aligning the set of features of the at least one component image
with a corresponding set of features on surfaces of one of a
three-dimensional virtual model and a at least one reference
image

316

Executing a neural network, by a processor, to identify a set of
defect-features for each defect on surfaces of the at least one
component image

318 identifying each defect based on at least one of: a type of defect,
physical dimensions of the defect, reparability of the defect,
serviceability of the defect, and criticality of the zones in which the
defect is located

320

Assigning a weight to each zone in which a defect is identified in,
the weight assigned depending on a zone-priority of each zone

322

Projecting each defect of the at least one component image onto
at least one of a three-dimensional virtual model and the at least
one component image

324

Overlaying each defect within the zones in which the defect is
located in (B)

FIG. 6B

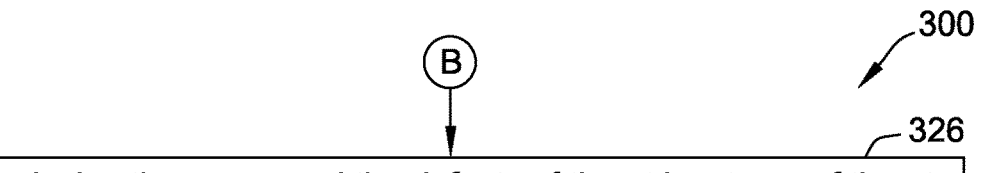

300

B

326

Displaying the zones and the defects of the at least one of the at least one of the three-dimensional virtual model and the at least one component image onto an output device

328

Outputting at least one of a data table on cost estimates to repair a component, a time estimate to repair a component, serviceability and reparability of a component, a method for repairing a component, location where a component is repaired, routing information, a three-dimensional virtual model having color-coded zones with defects, and a color-coded image of zones having defects

FIG. 6C

SYSTEM AND METHODS FOR ZONE-GUIDED REPAIR SCOPE OPTIMIZATION

BACKGROUND

The subject matter described herein relates to systems and methods for inspection of components, and more particular, to zone-guided systems and methods for inspection of components.

Periodic inspection of components is commonly performed by manufacturers and end users to ensure that the component is free of mechanical and material defects, and to determine the component is in proper working condition. Known defects may include, for example, surface stress fractures, fatigue cracking, and inelastic deformation generally, as well as surface finish defects such as pitting due to erosion or corrosion and the like, and/or chipping.

Known inspections can include a visual inspection for detecting surface defects, or measurements to determine variances in tolerances. As a result of such inspections, an operator may determine that the component is free of defects. Alternatively, a determination may be made that the component needs repair or refurbishment, that the component should be scrapped, or that a more detailed inspection and testing via specialized equipment and processes is necessary. In making such a determination, the operator may consider factors such as the type and size of the defect, the location of the defect on the component, the acceptable tolerance limits for the component, and/or other known factors that may influence the recommended course of action with the component, such as the amount of time necessary to conduct a repair or refurbishment, reliability analysis and computing remaining useful life of the part. In addition, depending on the component and/or the amount of damage or defects, an operator may weigh the costs associated with further inspection and processing relative to replacing the component entirely.

Although operators are trained on inspection techniques and cost evaluations, however the process may be subjective and may vary between operators and/or between different repair facilities. In addition, the determination process is inherently inefficient, as well as potentially inaccurate due to user error. Even with properly adopted guidelines and training procedures, operators commonly do not have the necessary authorization to approve scrapping and replacement of components, and the determination is commonly addressed by management, which may increase the inconsistencies and/or time of the process.

To facilitate improving the consistency of the process and to reduce the time associated with the process, at least some known facilities use automated inspection systems. At least some known automated inspection systems implement component imaging and defect recognition via machine learning algorithms in which a digital two-dimensional image of a surface of the component is analyzed. During analysis of the surface, conventional machine learning algorithms are used to detect surface defects. With the use of high-resolution imaging, relatively small defects such as hairline fractures can be detected and classified by the machine learning algorithms, however high-resolution imaging of hairline fractures can be processor-intensive and may require increased processing time.

Therefore, a need exists to provide systems and methods for inspection of components in a manner that facilitates improved processing, accuracy and consistency in classification and repairing of defects.

SUMMARY

In one aspect, an inspection system is disclosed. The inspection system including an image capturing system oriented to capture at least one component image of a component from at least one viewing angle, the at least one component image including a set of features selected to enable features of the components and features of defects on surfaces of the component to be identified; and a processor configured to: classify a type of defect detected on surfaces of the component in the at least one component image; and assign zones to surfaces of the component captured in the at least one component image.

In another aspect, a method for zone-guided repair scope optimization of a component is disclosed. The method includes providing an image captured by an image capturing system oriented to capture at least one component image of a component from at least one viewing angle, the at least one component image including a set of features selected to enable features of the components and features of defects on surfaces of the component to be identified; and classifying a type of defect detected on surfaces of the component in the at least one component image; and assigning zones to surfaces of the component captured in the at least one component image.

BRIEF DESCRIPTION OF THE DRAWINGS

The subject-matter of the disclosure will be explained in more detail in the following text with reference to exemplary embodiments that are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
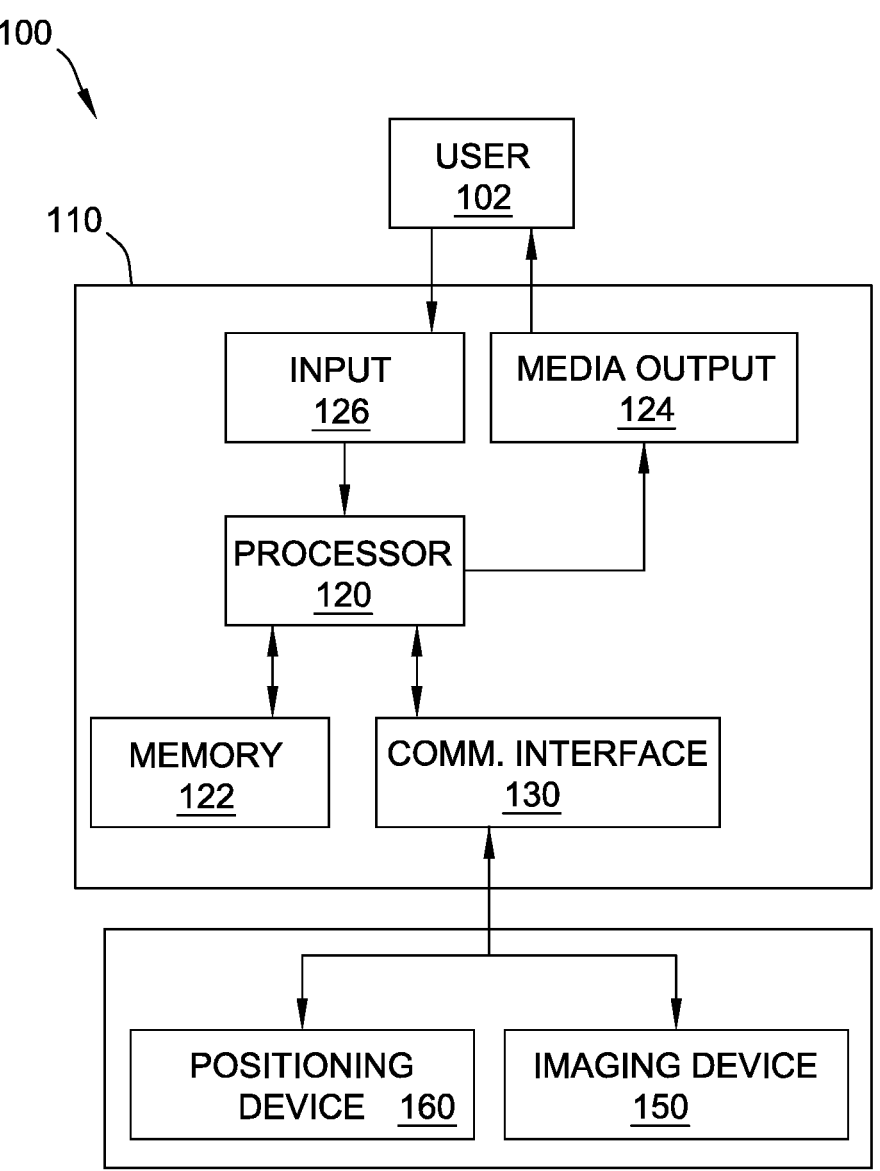
FIG. 1 is a schematic diagram of an exemplary computer processing system.

In the following specification and the claims, reference will be made to a number of terms, which shall be defined to have the following meanings.

As used herein, references to "example or exemplary embodiment" or "one embodiment" of the present disclosure are not intended to be interpreted as excluding the existence of additional embodiments that also incorporate the recited features.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

In one embodiment, a computer program is provided that is embodied on a computer readable medium. In the exemplary embodiment, the system is executed on a single computer system, without requiring a connection to a sever computer. In another embodiment, the system is executed in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is implemented on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is executed on Linux® OS (Linux is a registered trademark of Linus Torvalds of Boston, MA). The application is flexible and is designed to run in various different environments without compromising any major functionality. In some embodiments, the system includes multiple components distributed among a plurality of computing devices. One or more components may be in the form of computer-executable instructions embodied in a computer-readable medium.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The systems and processes are not limited to the specific embodiments described herein. In addition, components of each system and each process can be practiced independent and separate from other components and processes described herein. Each component and process also can be used in combination with other assembly packages and processes.

The embodiments described herein provide an inspection system and method for detailed inspection of components. The inspection system includes an image capturing system oriented to capture at least one component image of a component from at least one viewing angle, the at least one component image including a set of features selected to enable features of the components and features of defects on surfaces of the component to be identified, and a processor. The processor is configured to classify a type of defect detected on surfaces of the component in the at least one component image and assign zones to surfaces of the component captured in the at least one component image.

As used herein, the terms "defect" and refers to an area or region of a surface of a component which has been damaged as a result of normal operation and use of the component. The defects may include, but are not limited to only including, dislocations, cracks, wear, voids, inelastic deformations, stress concentrations, disruptions, fissures, inclusion of foreign particles, corrosion, surface stress fractures, fatigue cracking, chipping, and surface finish defects such as pitting due to erosion or corrosion and the like. The defects are perceivable on the surface of the component via a visual inspection.

FIG. 1 illustrates an exemplary configuration of a computing device 110 of an exemplary inspection system 100. In the exemplary embodiment, computing device 110 may be operated by a user 102 and is communicatively coupled to a remote device, such as an imaging device 150 and/or a positioning device 160. The computing device includes a processor 120 for executing instructions. In some embodiments, executable instructions are stored in a memory 122. Processor 120 may include one or more processing units (e.g., in a multi-core configuration). The memory 122 may be any device that enables information, such as executable instructions and/or transaction data to be stored and retrieved. The memory 122 may include one or more computer-readable media. The memory 122 may be local to the computing device 110 or may be stored on a remote network or cloud which is accessible by the computing device 110.

The computing device 110 may also include a communication interface 130 coupled to the imaging device 150 and to the positioning device 160. Communication interface 130 may include, for example, a wired or wireless network adapter and/or a wireless data transceiver for use with a mobile telecommunications network.

In some embodiments, the computing device 110 also includes at least one media output component 124 that presents information to the user 102. The media output component 124 may be any component capable of conveying information to a user 102. In some embodiments, media output component 124 includes an output adapter (not shown) such as a video adapter and/or an audio adapter. An output adapter may be operatively coupled to processor 120 and can be operatively coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 124 presents a graphical user interface (e.g., a web browser and/or a client application) to the user 102. A graphical user interface may include, for example, an interface for viewing the results of the analysis of one or more subject systems. In some embodiments, computing device 110 includes an input device 126 for receiving input from a user 102. Input device 126 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component, such as a touch screen, may function as both an output device of media output component 124 and as an input device 126.

Stored in memory 122 are, for example, computer-readable instructions for providing a user interface to user 102 via media output component 124 and, optionally, receiving and processing input from input device 126. A user interface may include, among other possibilities, a web browser and/or a client application. The processor 120 executes computer-executable instructions for implementing aspects of the disclosure. In some embodiments, the processor 120 is transformed into a special purpose microprocessor by executing computer-executable instructions or by otherwise being programmed.

Figure 2:
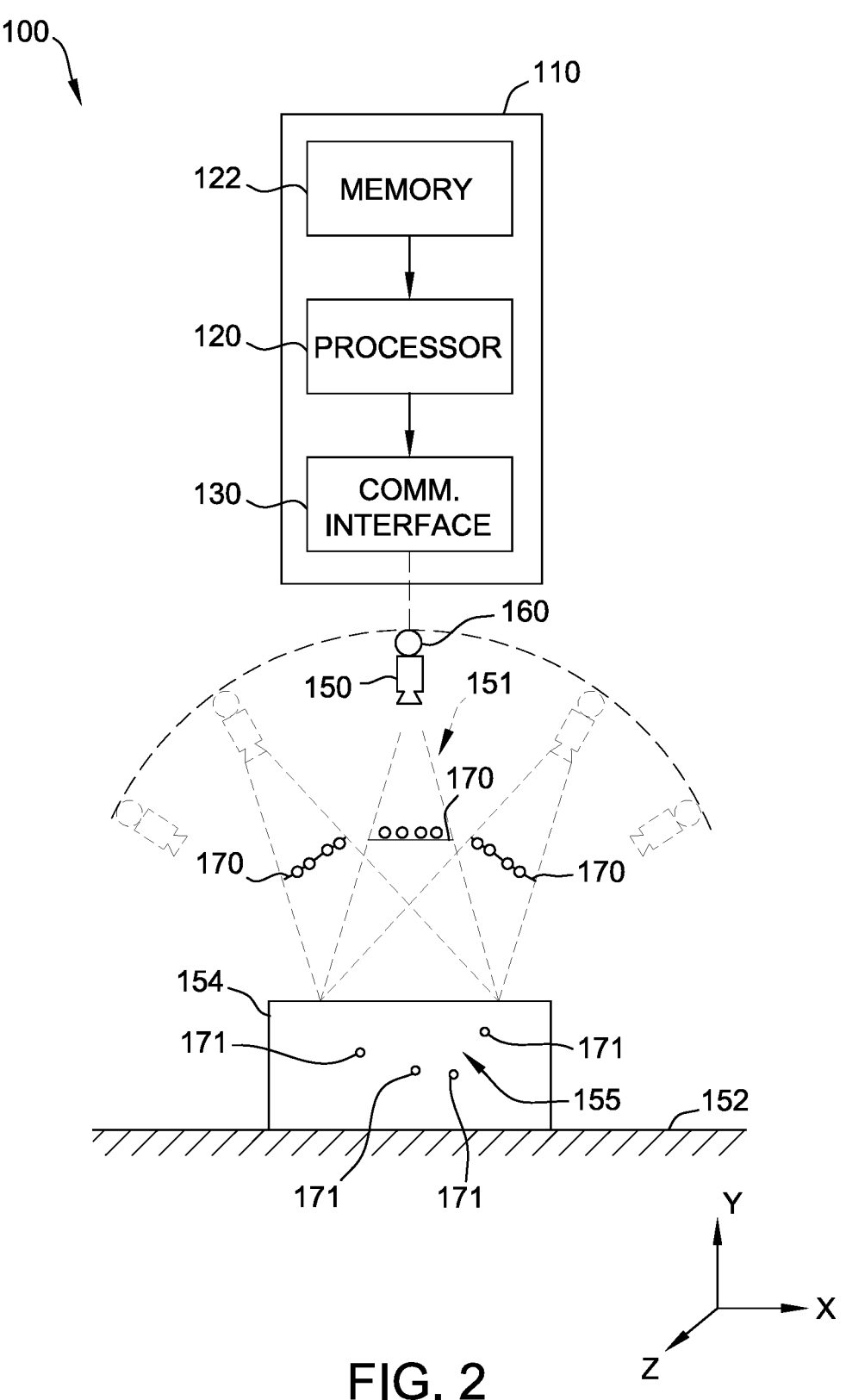
FIG. 2 is a schematic diagram of an exemplary inspection system including an imaging device for capturing component images.

As shown in FIG. 2, a component 154 to be inspected is positioned substantially flat on a platform 152 to enable surfaces 155 of the component 154 to be captured by the imaging device 150. The platform 152, the component 154 and the imaging device 150 are oriented in a space defined by X-Y-Z axes. The platform 152 is oriented horizontally relative to a plane defined by X-Z axes and the imaging device 150 is positioned above the platform 152 and is movable through the X-Y-Z space.

In some embodiments, the imaging device 150 is a stationary multi-camera system. In some embodiments, the imaging device 150 may be articulable by the positioning device 160. In some embodiments, the imaging device 150 is articulable such that a field of view 151 of the imaging devices captures at least a portion of the surfaces 155 of the component 154 from different angles. In some embodiments, multiple imaging devices 150 may be positioned at different angles relative to the platform 152 to enable the multiple imaging devices 150 to capture at least one component image 170 of side surfaces of the component 154, or more generally to capture component surface 155 from a plurality of different angles relative to the component 154. In some embodiments, the imaging device 150 is affixed to a robotic arm.

In some embodiments, the platform 152 may remain in a fixed position throughout the inspection process. For example, the platform 152 may remain stationary while the imaging device 150 is selectively moved relative to the platform 152 during the inspection process. Alternatively, the platform 152 may be selectively rotated during the inspection process via way of a swivel assembly (not shown) or a turn table (not shown).

Operation and actuation of the imaging device 150 and the positioning device 160 are controlled by the processor 120 and more generally, by the computing device 110. For example, the positioning device 160 can include a plurality of articulated arms or rails and actuators (not shown). The imaging device 150 is affixed to at least one of the arms or rails. In response to a control signal transmitted by the processor 120, the actuators may be selectively moved along the rails, or alternatively, the articulated arms may articulate in one or more directions in the X-Y-Z space.

The imaging device 150 capture two-dimensional digital images (each referred to as a component image 170) of surfaces 155 of the component 154 from a plurality of angles. The imaging device 150 captures at least one component image 170 and converts the images into data that is transmitted to the processor 120 and stored in memory 122 as image data. In some embodiments, the imaging device 150 is a sensing array. In some embodiments, the imaging device 150 is a detector array. In some embodiments, the imaging device 150 is an infra-red capture device. In some embodiments, the imaging device 150 is a photodiode or a positional sensor that detects and measures wavelengths of light along a spectrum captured by the imaging device 150. In some embodiments, the imaging device 150 converts wavelength measurements into vector measurements between the imaging device 150 and the surfaces 155 of the component 154. In some embodiments, the imaging device 150 is a charged-coupled device (CCD) camera or a charge injection device (CID) camera. CCD and CID cameras utilize an image sensor to register visible light as an electronic signal and convert the light into a two-dimensional pixelated image, wherein each image includes the surfaces 155 of the component 154. In some embodiments, the imaging device 150 is an RGB-D camera, wherein the imaging device 150 captures a two-dimensional pixelated image and the depth of the surfaces 155 of the component 154 relative to the least one imaging device 150. In some embodiments, the imaging device 150 may include one or more filters and/or lenses that restrict the wavelengths permitted to travel through the filters and/or lenses. By way of example, the imaging device 150 may include a barrier filter that only permits specific wavelengths in the visible light spectrum to penetrate the filter.

In some embodiments, multiple component images 170 from different viewing angles relative to the platform 152 are compiled into a single component image 170. It is understood that a complex component may require additional viewing angles. Each of the multiple component images 170 include metadata which, in some embodiments, includes relative positional information of the imaging device 150 from each angle. The processor 120 can merge the multiple component images 170 into the single component image 170 with the associated positional metadata.

The at least one component images 170 collected by the imaging device 150 for each viewing angle are accessible by the processor 120. For each component image 170, a set of feature points 171 are identified and the corresponding coordinates in the X-Y-Z axes are recorded as image metadata. The feature points 171 are selected based on their ability to easily match, and on their invariance to viewpoint, lighting, translation, rotation, and scale. As component images 170 from different angles are generated during an inspection process, each viewing angle and associated component image 170 and set of feature points 171 are registered within memory 122 and stored as image metadata. The same feature points 171 are then localized and identified on the at least one component image 170 as image metadata.

The set of feature points 171 and associated positional metadata are used in identifying and classifying features of the type of the component captured in the component images 170, and in identifying and classifying defects. Therefore, a set of feature points 171 used in identifying and classifying features of the type of the component are referred to herein as a set of component-type feature points 171 (where applicable), and a set of feature points 171 used in identifying and classifying features of defects are referred to herein as a set of defect-type feature points 171. The corresponding coordinates of the set of defect-type feature points 171 are used, by the processor 120 in determining dimensions, shape and size of each identified defect.

In some embodiments, a serial number, or more generally an identifier, provided by the user 102 through the input device 126 may be used for identifying the type of the component captured in the at least one component image 170, and the input can be stored in the database 1290 and/or memory 122 as image metadata. Because the component type has been provided through a user input, identification and classification of component-types is not necessary.

As will be explained in further detail below, a neural network—and in some embodiments, a machine learning algorithm—are executable by the processor 120 in identifying set of component-type feature points 171 and determining a component-type from the set of component-type feature points 171. The component-type feature points 171 of the at least one component image 170 are then aligned with component-type feature points of a reference image or a reference three-dimensional virtual model. A Perspective-n-Point (PnP) process executed by the processor 120 then maps the defects by either projecting or back-projecting the defects identified in the at least one component image 170 onto the reference image or the reference three-dimensional virtual model. The Perspective-n-Point (PnP) process, mapping, projecting and back-projecting are exemplary methods and algorithms and are not intended to be limiting. As will also be explained in further detail below, zones stored as metadata of the reference image or the reference three-dimensional virtual model may also be projected or back-projected from the reference image or the reference three-dimensional virtual model by use of the Perspective-n-Point (PnP) process.

Figure 3A:
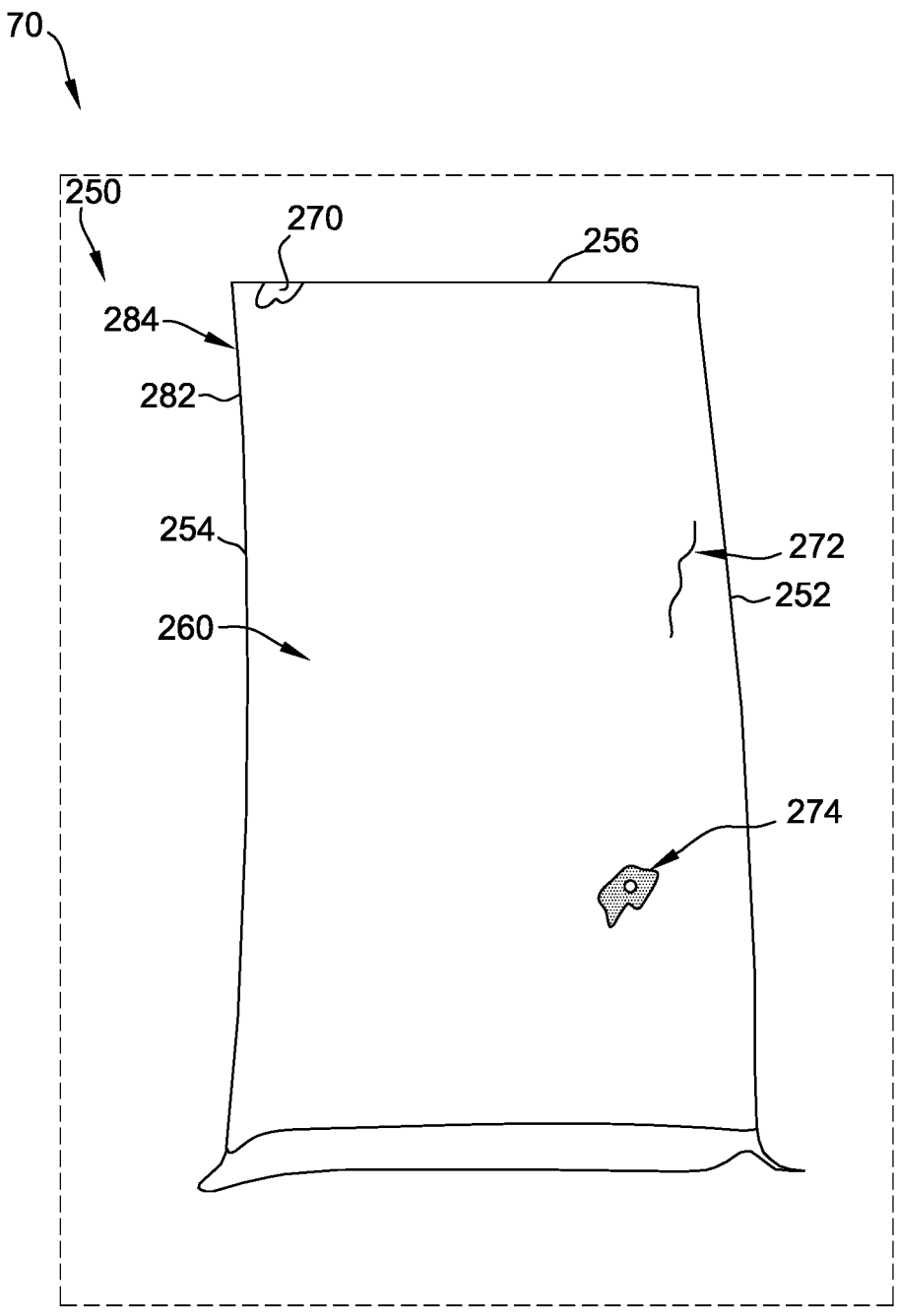
FIG. 3A illustrates an exemplary component image captured by the imaging device of FIG. 2.
Figure 4:
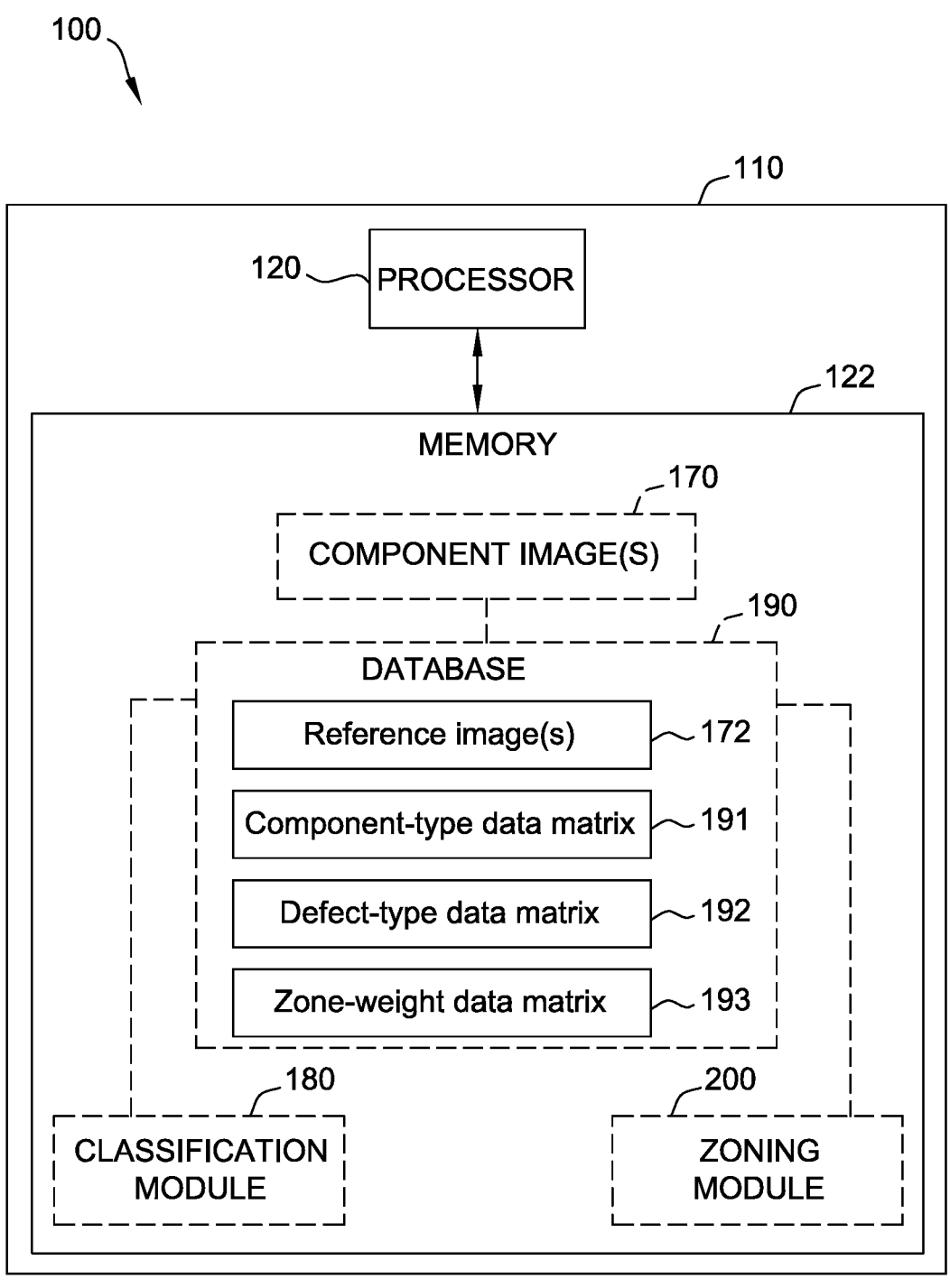
FIG. 4 illustrates exemplary data stored in memory of the computer processing system of FIG. 1.
Figure 5:
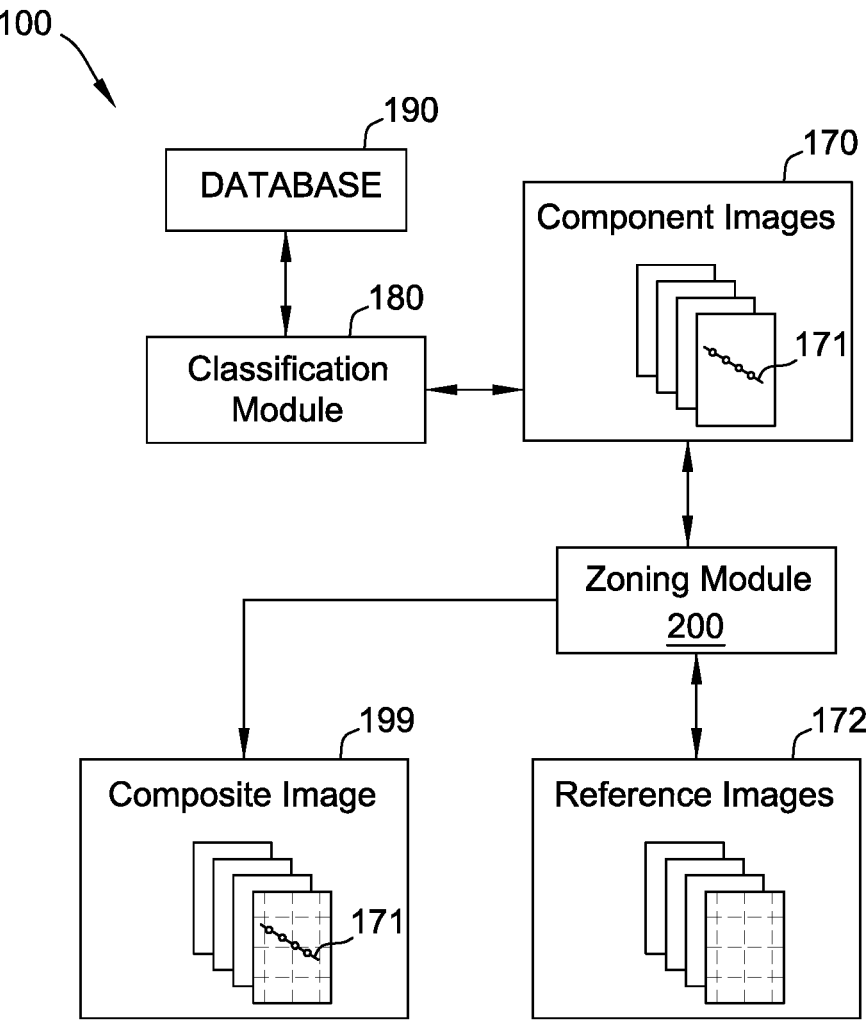
FIG. 5 illustrates an exemplary operations diagram of a classification module and a zoning module operated by the processor of the computer processing system of FIG. 1; and, FIGS. 6A through 6C illustrate exemplary flow diagrams of an exemplary method 300 for inspecting a component.

FIG. 3A illustrates a component image 170 of an exemplary airfoil-component 250 captured by the imaging device 150. It is understood that the airfoil component 250 is merely an illustrative example of a machine part that requires inspection for defects and is not intended to be limiting. The airfoil-component 250 includes identifiable component-features and defect-features that are utilized by the processor 120 in classifying the type of component captured in the component image 170. Such identifiable features may include for example, a leading edge 252, a trailing edge 254, a base 258, and a cantilevered tip 256 of the airfoil-component 250. Features may also include surface variations on the airfoil-component 250. Due to normal use of the airfoil-component 250 in an assembly such as a turbine, defects may appear on the airfoil-component 250. Such defects may include for example, chipping 270, stress fractures 272 and/or surface finish defects 274, such as pitting due to corrosion. The component-features and defect-features are identifiable by the processor 120 by executing a classification module 180 as shown in FIGS. 4-5 and explained in further detail below. FIG. 3A illustrates a single component image 170, however it is understood that multiple component images 170 from different viewing angles may be captured by the imaging device 170. The identifiable features captured and associated positional information in each of the multiple component images 170 are stored in metadata. Each of the multiple component images 170 and metadata may be stitched together, and the metadata combined.

Figure 3B:
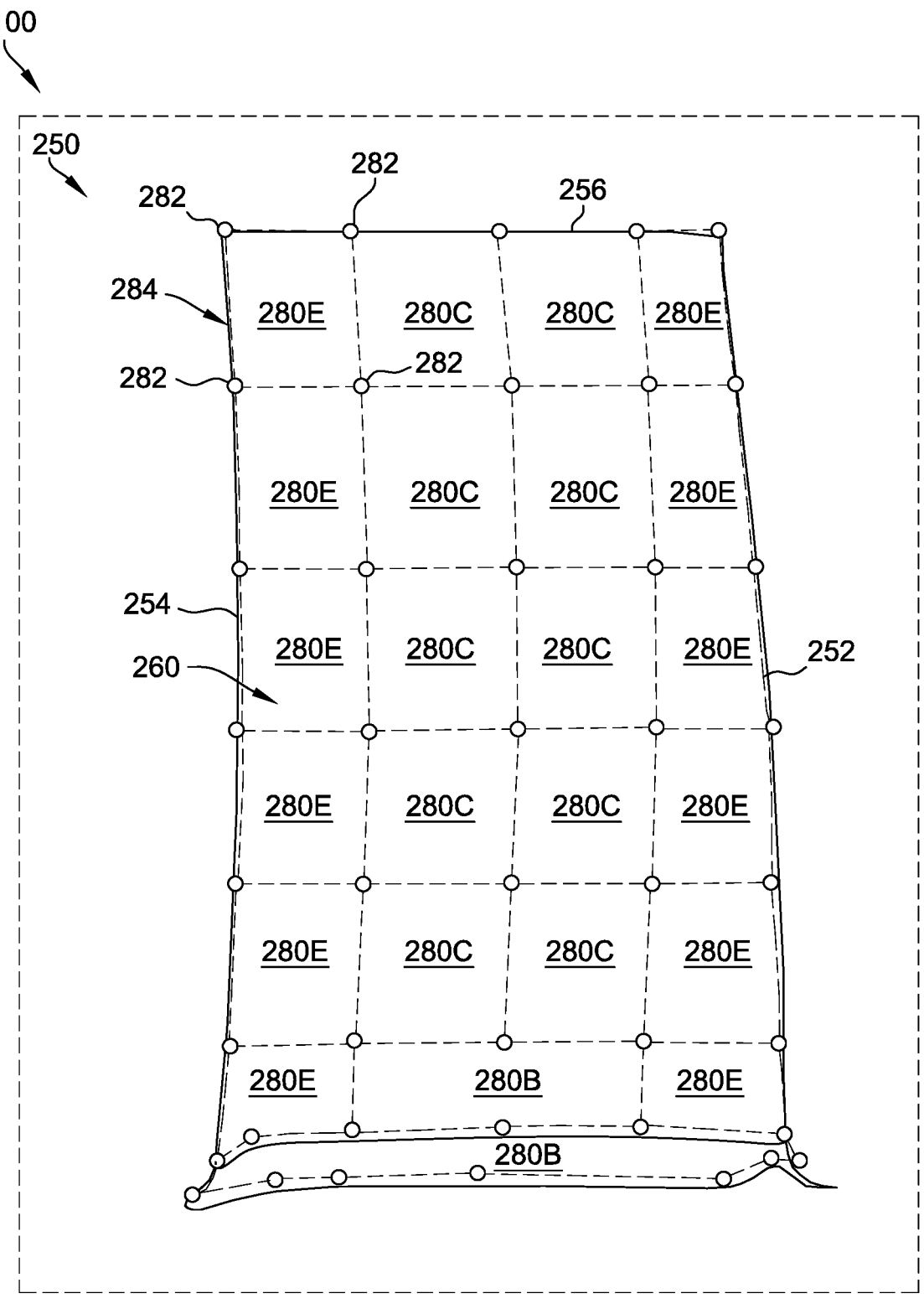
FIG. 3B illustrates a reference image stored in memory.

FIG. 3B illustrates a reference image 172 of the exemplary airfoil-component 250 which is stored in memory 122 and is accessible by the processor 120 for aligning identifiable component-features and defect-features (shown in the at least one component image 170 and captured by the imaging device 150) with reference component-features of the reference image 172. In the illustrated embodiment, the reference image 172 is a single, two-dimensional image stored in memory 122. In some embodiments, multiple reference images 172 may be stored in memory 122, each of the multiple reference images 172 corresponding to the different viewing angles in which the imaging device 150 captures component images 170. In some embodiments, a reference three-dimensional virtual model is stored in memory 122. The reference image 172 of the exemplary airfoil-component 250 is merely illustrative of a reference image for a component stored in memory 122. It is understood that reference images for any type of component may be stored in memory 122.

The reference image 172 (or reference three-dimensional virtual model) includes pre-defined virtual zones on surfaces 260 of the exemplary airfoil-component 250. The surfaces 260 of the airfoil-component 250 are divided into virtual zones 280E, 280C, 280B arranged in a matrix. Each of the designated zones 280E, 280C, 280B extend across surface areas defined by at least three points 282. Each of the at least three points 282 are connected together via segmented lines 284. The zones 280E, 280C, 280B may have any shape and/or size (representing a resolution of the zone matrix). In the illustrated embodiment, those zones adjacent to the leading edge 252 and the trailing edge 254 are defined as edge zones 280E, those zones adjacent to the base 258 are defined as base zones 280B, and those zones centrally oriented between the edge zones 280E are defined as center zones 280C. In some embodiments, zones 280E, 280C, 280B that are located at critical regions of the airfoil-component 250 may have a greater resolution and may encompass a smaller surface area relative to those zones 280E, 280C, 280B defined at non-critical regions of the airfoil-component 250. By way of example, in the exemplary embodiment, base zones 280B encompass a larger surface area than the edge zones 280E.

The virtual zones 280E, 280C, 280B are shaped and selected according to one or more parameters and are assigned a zone-priority. In some embodiments, the zone-priority represents a relative numerical value of importance for the zone. By way of example, edge zones 280E may be designated with a higher zone-priority relative to center zones 280C or base zones 280B due to the relative fragility of the leading edge 252 and the trailing edge 254. Likewise, base zones 280B may be assigned a lower zone-priority due to the relative robustness of the base 258. Generally, the zone-priority is determined by empirical data or modeling data (such as finite element analysis) Determinations may include at least one of a relative fragility and robustness of the zone, a difficulty of repairing the zone, a time and cost of repairing the defects in the zone, a type of one or more defects in each of the zones, a method of repairing the type of one or more defects in each of the zones and, materials necessary to repair the one or more defects in each of the zones. The zones 280E. 280C, 280B and the priorities are generated and designated by the processor 120 with the use of a zoning module 200 and are explained in further detail below.

As shown in FIG. 4, stored in memory 122 are the at least one component image 170 captured by the imaging device 150, reference images 172 (and/or the three-dimensional virtual model), the classification module 180, and the zoning module 200. Also stored in memory 122 is a database 190. The at least one component image 170, reference image(s) 172 (and/or the three-dimensional virtual model), the classification module 180, and zoning module 200 may be stored within the database 190 or may be stored in separate databases. The database 190 includes one or more digital data matrices that are accessible by the processor 120, the classification module 180, and the zoning module 200. Functions of the classification module 180 and the zoning module 200 are accessed and executed by the processor 120, however it is understood that the function of the classification module 180 may be integral functions of the processor 120.

In some embodiments, the database 190 is pre-populated by the user 102. In some embodiments, the database 190 is populated and/or updated by the processor 120. In some embodiments, the database 190 is populated and/or updated by the processor 120 utilizing machine learning or artificial intelligence (AI) algorithms. Stored in the database 190 are, without limitation, application source code, application object code, configuration data, additional input events, application states, assertion statements, validation results, and/or any other type of data.

The data matrices include, but are not limited to, a component-type data matrix 191, a defect-type data matrix 192, and a zone-weight data matrix 193. Each of the component-type data matrix 191, the defect-type data matrix 192, and the zone-weight data matrix 193 are accessible by the processor 120 independently or in combination.

Features and associated types of components are stored in the component-type data matrix 191. Non-limiting examples of types of components may include airfoils, combustor liners, nozzles, shafts, wheels, pistons, and the like. Features generally refer to characteristic elements of the component 154 such as contours, edges, apertures, perforations, and/or surface finishes observed by the imaging device 150. By way of example, in FIG. 3A, the features associated with the exemplary airfoil-component 250 are the leading edge 252, the trailing edge 254, the base 258, and the cantilevered tip 256, as well as perforations formed across the surface 260 of the airfoil-component 250. In some embodiments, the component-type data matrix 191 is pre-populated by the user 102. In some embodiments, the component-type data matrix 191 is loaded from an external source into memory 122. Through the use of machine-learning, the component-type data matrix 191 is populated by the processor 120.

Defect features and associated types of defects are stored in the defect-type data matrix 192. Non-limiting examples of types of defects may include dislocations, cracks, wear, voids, inelastic deformations, stress concentrations, disruptions, fissures, inclusion of foreign particles, corrosion, surface stress fractures, fatigue cracking, chipping, and/or surface finish defects, such as pitting due to erosion or corrosion. Defect features generally refer to characteristic elements of the defects such as contours, edges, apertures, and reflection variations observed by the imaging device 150. By way of example, in FIG. 3A, the defect features associated with the airfoil-component 250 are the chipping 270, stress fractures 272, and surface finish defects 274 on the surfaces 260 of the airfoil-component 250.

The zone-weight data matrix 193 includes parameters for defining zones across any type of component. The processor 120 accesses the zone-weight data matrix 193 to assign a zone-priority to each of the zones using a zone-priority data matrix stored in memory. The zone-priority for each type of component are pre-programmed by engineering or design departments. In some embodiments, the zone-priority may be defined based on empirical data from prior manual inspections or may be defined at least partially by finite element analysis simulations. By way of example, in FIG. 3, the zone-weight data matrix 193 is programmed to assign the edge zones 280E to leading edge 252 and the trailing edge 254 of the airfoil-component 250. Similarly, the zone-weight data matrix 193 is programmed to assign the base zones 280B to the base 258 of the airfoil-component 250. The zone-weight data matrix 193 also includes parameters for assigning priorities to the zones. The parameters include but are not limited to: (i) the relative fragility or robustness of the zone, (ii) the difficulty of repairing the zone, (iii) the time and cost of repairing the zone, (iv) the type(s) of defect(s) in the zone. (v) the method of repairing the type of defect in the zone and, (vi) the materials necessary to repair the type of defect in the zone. Parameters may also be determined based on the complex geometry of components and the operating conditions in which the components operate in. Different sections of the component may undergo different degradation and develop different types and sizes of defects. The sum of the parameters determined result in a component-weight value. The component-weight value may be used in determining if a component being inspected is repairable, scrapable, or if the component has passed inspection.

FIG. 5 illustrates an exemplary systems operations diagram of the classification module 180 and the zoning module 200 as executed by the processor 120. The at least one component image 170 is processed by the classification module 180 and the zoning module 200 generally, however it is understood that the function of the classification module 180 may be integral functions of the processor 120.

At least one component image 170 is captured by the imaging device 150 as previously described and are stored in memory 122. The imaging device 150 is oriented to capture at least one component image 170 of a component from at least one viewing angle. The at least one component image 170 includes the set of component-type feature points 171 for identifying the type of the component captured in the at least one component image 170, and the at least one component image 170 includes the set of defect-type feature points 171 for identifying defects 274 on surfaces 155 of the at least one component image 170. The set of component-type feature points 171 for identifying the type of the component and the set of defect-type feature points 171 for identifying defects 274 enable features of the components and features of defects on surfaces of the component to be identified. In some embodiments, a serial number, or more generally an identifier, provided by the user 102 through the input device 126 may be used for identifying the type of the component captured in the at least one component image 170, and the input can be stored in the database 1290 and/or memory 122 as image metadata.

The at least one component image 170 is classified through the classification module 180 with access to the matrices stored in the database 190. The classification module 180 identifies features found in the at least one component image 170 and determines the type of component. To assign a component-type to a component captured in the component images 170, the classification module 180 detects identifiable features found in the at least one component image 170 and compares those identifiable features against the component-type data matrix 191 of FIG. 4. After a threshold number of identifiable features are found in the at least one component image 170, the classification module 180 assigns a component-type to the at least one component image 170 and stores the component-type in the database 190 as image metadata.

In some embodiments, the features may be identified by a multi-class recognition and classification process and identifying features (such as feature points 171) based on a classification process refined during one or more training phases. In some embodiments, the classification module 180 utilizes a training process involving self-learning and image augmentation to increase the accuracy of a classification process for the at least one component image 170. The processor 120 classifies the at least one component image 170 and learns from the classification process using a deep convolutional neural network (CNN) such as a U-net style image segmentation method. More generally, in some embodiments, the neural network is a segmentation neural network and is trained using a machine learning algorithm.

Accordingly, the accuracy by which processor 120 classifies the at least one component image 170 is facilitated to be increased as processor 120 classifies additional component images 170. In some embodiments, incorrectly classified component images 170 are identified and reclassified by the processor 120 accessing the classification module 180. Thus, the classification module 180 may correct any classification errors causing the initial, incorrect classification of the at least one component image 170 and subsequently identify the at least one component image 170 correctly.

In some embodiments, the classification module 180 uses a threshold of component images 170 in each class to determine if classification module 180 has classified a sufficient number of the component images 170 to be considered accurate for identifying features or and classifying component images 170 that correspond to the respective class. The features used to correctly classify the type of components are stored in the database 190.

As previously set forth with reference to FIG. 3B, at least one reference image 172 (or the reference three-dimensional virtual model) includes pre-defined virtual zones on surfaces of the component. The at least one reference image 172 and the at least one component image 170 are aligned such that the zones of the at least one reference image 172 may be mapped onto the at least one component image 170 or vice versa by the zoning module 200. Additionally, defects captured in the at least one component image 170 may be mapped onto the at least one reference image 172. The resulting composite image 199 therefore includes both zones and defects. In some embodiments, a composite three-dimensional virtual includes the defects captured in the at least one component image 170 and the zones (from the at least one reference image 172 or the reference three-dimensional virtual model.

To apply the virtual zones of the at least one reference image 172 to the at least one component image 170, the zoning module 200 aligns component-features (stored as the set of component-type feature points 171) of the at least one component image 170 with reference points of the reference image 172 such that the at least one component image 170 is aligned with the respective at least one reference image 172 taken from the same viewing angle by the imaging device 150. Similarly, to apply the virtual zones of the reference three-dimensional virtual model to the at least one component image 170, the zoning module 200 aligns component-features (stored as the set of component-type feature points 171) of the at least one component image 170 with reference points of the reference three-dimensional virtual model such that the at least one component image 170 is aligned with the reference three-dimensional virtual model. Positional metadata of the at least one component image from each of the at least one viewing angle facilitates alignment with the three-dimensional virtual model.

After proper alignment of the at least one component image 170 with the at least one reference image 172 (or the reference three-dimensional virtual model), the zoning module 200 configured to project each defect of the at least one component image 170 onto the resulting composite image 199 (or the resulting three-dimensional virtual model). In some embodiments, each defect is overlayed within the zones in which the defect is located in. In some embodiments, the zones are back-projected from the at least one reference image 172 (or the reference three-dimensional virtual model) onto the at least one reference image 172 to result in the resulting composite image 199.

FIGS. 6A through 6C are flow diagrams of an exemplary method 300 for zone-guided repair scope optimization of a component. The method 300 includes providing 302, an image captured by an image capturing system (such as the imaging device 150) oriented to capture at least one component image 170 of a component (154, 250) from at least one viewing angle, the at least one component image 170 including a set of features 171 selected to enable features of the components and features of defects 274 on surfaces of the component to be identified. The method further includes classifying 304 a type of defect 274 detected on surfaces 155 of the component 154 in the at least one component image 170 and, assigning 306 zones (such as zones 280B, 280C, 280E) to surfaces 155 of the component 154 captured in the at least one component image 170.

In some embodiments, the method 300 further includes assigning 308 a zone-priority to each of the zones (280B, 280C, 280E) and determining 310 the zone-priority of each of the zones (280B, 280C, 280E) by empirical data including at least one of a relative fragility and robustness of the zone, a difficulty of repairing the zone, a time and cost of repairing the defects 274 in the zone, a type of one or more defects 274 in each of the zones (280B, 280C, 280E), a method of repairing the type of one or more defects 274 in each of the zones (280B, 280C, 280E) and, materials necessary to repair the one or more defects 274 in each of the zones (280B, 280C, 280E).

In some embodiments, the method 300 further includes identifying 312 component-features found in the at least one component image 170 and aligning 314 the set of features of the at least one component image 170 with a corresponding set of features on surfaces of one of a three-dimensional virtual model 202 and an at least one reference image.

In some embodiments, the method 300 further includes executing 316 a neural network to identify a set of defect-features for each defect 274 on surfaces 155 of the at least one component image 170. In some embodiments, the neural network is trained using a machine learning algorithm.

In some embodiments, the method 300 further includes identifying 318 each defect 274 based on at least one of: a type of defect, physical dimensions of the defect, repairability of the defect, serviceability of the defect, and criticality of the zones (280B, 280C, 280E) in which the defect 274 is located. In some embodiments, the method 300 further includes assigning 320 a weight to each zone in which a defect 274 is identified in, the weight assigned depending on a zone-priority of each zone (280B, 280C, 280E). In some embodiments, the method 300 further includes projecting 322 each defect 274 of the at least one component image 170 onto at least one of a three-dimensional virtual model and the at least one component image 170 and overlaying 324 each defect 274 within the zones (280B, 280C, 280E) in which the defect 274 is located in.

In some embodiments, the method 300 further includes displaying 326 the zones (280B, 280C, 280E) and the defects 274 of the at least one of the at least one of the three-dimensional virtual model and the at least one component image 170 onto an output device 124, and in some embodiments the method 300 further includes outputting 328 at least one of a data table on cost estimates to repair a component, a time estimate to repair a component, serviceability and repairability of a component, a method for repairing a component, location where a component is repaired, routing information, a three-dimensional virtual model having color-coded zones (280B, 280C, 280E) with defects 274, and a color-coded image of zones (280B, 280C, 280E) having defects 274.

The described systems and methods provide an inspection system capable of using empirical test data to facilitate optimizing the inspection of components. The described systems and methods facilitate improving repair times and costs by leveraging prior knowledge of time and cost of repairs for a given zone. This is particularly important as the same type and size of defect in different zones may take a different time and/or a different cost to repair.

The inspection results can be used by inspection facilities to estimate the number of scrap components and inventory needed to replace or repair damaged components. Depending on the type, size and location of defects, different repair strategies can be employed to improve repair process. The inspection system overlays each defect within the zones in which the defect is located in and displays the zones and defects as user output. The inspection system is configured to output at least one of a data table on cost estimates to repair a component, a time estimate to repair a component, serviceability and repairability of a component, a method for repairing a component, location where a component is repaired, routing information, a three-dimensional virtual model having color-coded zones with defects, and a color-coded image of zones having defects. The described systems and methods also standardize inspections which improves accuracy and reduces costs.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

In addition, the disclosed disclosure may be embodied in the form of computer-implemented processes and apparatuses for practicing those processes. The present, disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The methods, systems, and compositions disclosed herein are not limited to the specific embodiments described herein, but rather, steps of the methods, elements of the systems, and/or elements of the compositions may be utilized independently and separately from other steps and/or elements described herein. For example, the methods, systems, and compositions are not limited to practice with only a rotary machine as described herein. Rather, the methods, systems, and compositions may be implemented and utilized in connection with many other applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses.

An inspection system including an image capturing system oriented to capture at least one component image of a component from at least one viewing angle, the at least one component image including a set of features selected to enable features of the components and features of defects on surfaces of the component to be identified; and a processor configured to: classify a type of defect detected on surfaces of the component in the at least one component image; and assign zones to surfaces of the component captured in the at least one component image.

The inspection system according to the preceding clause, wherein the processor assigns a zone-priority to each of the zones using a zone-priority data matrix stored in memory.

The inspection system according to any preceding clause, wherein the memory is configured to store the zone-priority data matrix in which the zone-priority is determined by empirical data including at least one of a relative fragility and robustness of the zone, a difficulty of repairing the zone, a time and cost of repairing the defects in the zone, a type of one or more defects in each of the zones, a method of repairing the type of one or more defects in each of the zones and, materials necessary to repair the one or more defects in each of the zones.

The inspection system according to any preceding clause, wherein the processor is further configured to identify component-features found in the at least one component image.

The inspection system according to any preceding clause, wherein memory is configured to store at least one of a three-dimensional virtual model of the component having zones mapped across its surfaces, and at least one reference image of the component having zones mapped across its surfaces.

The inspection system according to any preceding clause, wherein the processor is configured to align the set of features of the at least one component image with a corresponding set of features on surfaces of one of the three-dimensional virtual model and the at least one reference image.

The inspection system according to any preceding clause, wherein the processor is configured to execute a neural network to identify a set of defect-features for each defect on surfaces of the at least one component image.

The inspection system according to any preceding clause, wherein the neural network is a segmentation neural network.

The inspection system according to any preceding clause, wherein the neural network is trained using a machine learning algorithm.

The inspection system according to any preceding clause, wherein the processor is further configured to identify each defect based on at least one of: a type of defect, physical dimensions of the defect, repairability of the defect, serviceability of the defect, and criticality of the zones in which the defect is located.

The inspection system according to any preceding clause, wherein the processor is further configured to assign a weight to each zone in which a defect is identified in, the weight assigned depending on a zone-priority of each zone.

The inspection system according to any preceding clause, wherein the processor is configured to project each defect of the at least one component image onto at least one of a three-dimensional virtual model and the at least one component image.

The inspection system according to any preceding clause, wherein the processor is configured to overlay each defect within the zones in which the defect is located in.

The inspection system according to any preceding clause, wherein the zones and the defects of the at least one of the at least one of the three-dimensional virtual model and the at least one component image are stored in memory and displayed onto an output device.

The inspection system according to any preceding clause, wherein the processor is configured to output at least one of a data table on cost estimates to repair a component, a time estimate to repair a component, serviceability and repairability of a component, a method for repairing a component, location where a component is repaired, routing information, a three-dimensional virtual model having color-coded zones with defects, and a color-coded image of zones having defects.

A method for zone-guided repair scope optimization of a component, the method including: providing an image captured by an image capturing system oriented to capture at least one component image of a component from at least one viewing angle, the at least one component image including a set of features selected to enable features of the components and features of defects on surfaces of the component to be identified; and classifying a type of defect detected on surfaces of the component in the at least one component image; and assigning zones to surfaces of the component captured in the at least one component image.

The method according to the preceding clause further including assigning a zone-priority to each of the zones.

The method according to any preceding clause further including determining the zone-priority of each of the zones by empirical data including at least one of a relative fragility and robustness of the zone, a difficulty of repairing the zone, a time and cost of repairing the defects in the zone, a type of one or more defects in each of the zones, a method of repairing the type of one or more defects in each of the zones and, materials necessary to repair the one or more defects in each of the zones.

The method according to any preceding clause further including identifying component-features found in the at least one component image.

The method according to any preceding clause further including aligning the set of features of the at least one component image with a corresponding set of features on surfaces of one of a three-dimensional virtual model and a at least one reference image.

The method according to any preceding clause wherein the neural network is a segmentation neural network.

The method according to any preceding clause further including executing a neural network, by a processor, to identify a set of defect-features for each defect on surfaces of the at least one component image.

The method according to any preceding clause further including training the neural network using a machine learning algorithm.

The method according to any preceding clause further including identifying each defect based on at least one of: a type of defect, physical dimensions of the defect, repairability of the defect, serviceability of the defect, and criticality of the zones in which the defect is located.

The method according to any preceding clause further including assigning a weight to each zone in which a defect is identified in, the weight assigned depending on a zone-priority of each zone.

The method according to any preceding clause further including projecting each defect of the at least one component image onto at least one of a three-dimensional virtual model and the at least one component image.

The method according to any preceding clause further including overlaying each defect within the zones in which the defect is located in.

The method according to any preceding clause further including displaying the zones and the defects of the at least one of the at least one of the three-dimensional virtual model and the at least one component image onto an output device.

The method according to any preceding clause further including outputting at least one of a data table on cost estimates to repair a component, a time estimate to repair a component, serviceability and repairability of a component, a method for repairing a component, location where a component is repaired, routing information, a three-dimensional virtual model having color-coded zones with defects, and a color-coded image of zones having defects.

What is claimed is:

1. An inspection system comprising:
an image capturing system oriented to capture at least one component image of a component from at least one viewing angle, the at least one component image including a set of features selected to enable features of the components and features of defects on surfaces of the component to be identified;
a processor configured to:
classify a type of defect detected on surfaces of the component in the at least one component image; and
assign zones to surfaces of the component captured in the at least one component image,
wherein the assigned zones correspond to non-overlapping, distinct, defined portions of the surfaces of the component, and
wherein the assigned zones collectively encompass an entirety of the surfaces of the component captured in the at least one component image.

2. The inspection system of claim 1, wherein the processor assigns a zone-priority to each of the assigned zones using a zone-priority data matrix stored in a memory.

3. The inspection system of claim 2, wherein the memory is configured to store the zone-priority data matrix in which the zone-priority is determined by empirical data including at least one of a relative fragility and robustness of the assigned zone, a difficulty of repairing the assigned zone, a time and cost of repairing the defects in the assigned zone, a type of one or more defects in each of the assigned zones, a method of repairing the type of one or more defects in each of the assigned zones and, materials necessary to repair the one or more defects in each of the assigned zones.

4. The inspection system of claim 1, wherein the processor is further configured to identify component-features found in the at least one component image.

5. The inspection system of claim 4, wherein the memory is configured to store at least one of a three-dimensional virtual model of the component having the assigned zones mapped across its surfaces, and at least one reference image of the component having the assigned zones mapped across its surfaces.

6. The inspection system of claim 5, wherein the processor is configured to align a set of component-features of the at least one component image with a corresponding set of component-features on surfaces of one of the three-dimensional virtual model and the at least one reference image.

7. The inspection system of claim 4, wherein the processor is configured to execute a neural network to identify a set of defect-features for each defect on surfaces of the at least one component image.

8. The inspection system of claim 7, wherein the neural network is a segmentation neural network.

9. The inspection system of claim 7, wherein the neural network is trained using a machine learning algorithm.

10. The inspection system of claim 7, wherein the processor is further configured to identify each defect based on at least one of: a type of defect, physical dimensions of the defect, repairability of the defect, serviceability of the defect, and criticality of the assigned zones in which the defect is located.

11. The inspection system of claim 10, wherein the processor is further configured to assign a weight to each assigned zone in which a defect is identified in, the weight assigned depending on a zone-priority of each assigned zone.

12. An inspection system comprising:
an image capturing system oriented to capture at least one component image of a component from at least one viewing angle, the at least one component image including a set of features selected to enable features of the components and features of defects on surfaces of the component to be identified;

a processor configured to:

classify a type of defect detected on surfaces of the component in the at least one component image; and assign zones to surfaces of the component captured in the at least one component image, wherein the assigned zones correspond to non-overlapping, distinct, defined portions of the surfaces of the component;

wherein the processor is further configured to identify component-features found in the at least one component image:

wherein the processor is configured to execute a neural network to identify a set of defect-features for each defect on surfaces of the at least one component image wherein the processor is further configured to identify each defect based on at least one of: a type of defect, physical dimensions of the defect, repairability of the defect, serviceability of the defect, and criticality of the zones in which the defect is located; and wherein the processor is configured to project each defect of the at least one component image onto at least one of a three-dimensional virtual model and the at least one component image.

13. The inspection system of claim 12, wherein the processor is configured to overlay each defect within the zones in which the defect is located in.

14. The inspection system of claim 13, wherein the zones and the defects of the at least one of the at least one of the three-dimensional virtual model and the at least one component image are stored in memory and displayed onto an output device.

15. The inspection system of claim 13, wherein the processor is configured to output at least one of a data table on cost estimates to repair a component, a time estimate to repair a component, serviceability and repairability of a component, a method for repairing a component, location where a component is repaired, routing information, a three-dimensional virtual model having color-coded zones with defects, and a color-coded image of zones having defects.

16. A method for zone-guided repair scope optimization of a component, the method comprising:

providing an image captured by an image capturing system oriented to capture at least one component image of a component from at least one viewing angle, the at least one component image including a set of features selected to enable features of the components and features of defects on surfaces of the component to be identified;

classifying a type of defect detected on surfaces of the component in the at least one component image; and assigning zones to surfaces of the component captured in the at least one component image, wherein the assigned zones correspond to non-overlapping, distinct, defined portions of the component; and wherein the assigned zones collectively encompass an entirety of the surfaces of the component captured in the at least one component image.

17. The method of claim 16 further comprising assigning a zone-priority to each of the assigned zones.

18. The method of claim 17 further comprising determining the zone-priority of each of the assigned zones by empirical data including at least one of a relative fragility and robustness of the zone, a difficulty of repairing the assigned zone, a time and cost of repairing the defects in the assigned zone, a type of one or more defects in each of the assigned zones, a method of repairing the type of one or more defects in each of the assigned zones and, materials necessary to repair the one or more defects in each of the assigned zones.

19. The method of claim 16 further comprising identifying component-features found in the at least one component image.

20. The method of claim 19 further comprising aligning the set of features of the at least one component image with a corresponding set of features on surfaces of one of a three-dimensional virtual model and at least one reference image.

21. The method of claim 19 further comprising executing a neural network, by a processor, to identify a set of defect-features for each defect on surfaces of the at least one component image.

22. The method of claim 21, wherein the neural network is a segmentation neural network.

23. The method of claim 21 further comprising training the neural network using a machine learning algorithm.

24. The method of claim 21, further comprising identifying each defect based on at least one of: a type of defect, physical dimensions of the defect, repairability of the defect, serviceability of the defect, and criticality of the assigned zones in which the defect is located.

25. The method of claim 24 further comprising assigning a weight to each assigned zone in which a defect is identified in, the weight assigned depending on a zone-priority of each assigned zone.

26. The method of claim 24 further comprising projecting each defect of the at least one component image onto at least one of a three-dimensional virtual model and the at least one component image.

27. The method of claim 26 further comprising overlaying each defect within the zones in which the defect is located in.

28. The method of claim 27 further comprising displaying the zones and the defects of the at least one of the at least one of the three-dimensional virtual model and the at least one component image onto an output device.

29. The method of claim 27 further comprising outputting at least one of a data table on cost estimates to repair a component, a time estimate to repair a component, serviceability and repairability of a component, a method for repairing a component, location where a component is repaired, routing information, a three-dimensional virtual model having color-coded zones with defects, and a color-coded image of zones having defects.

* * * * *